(12) United States Patent
Johnson, Jr. et al.

(10) Patent No.: US 6,492,792 B1
(45) Date of Patent: Dec. 10, 2002

(54) BATTERY TRICKLE CHARGING CIRCUIT

(75) Inventors: Robert Michael Johnson, Jr., Lake Zurich, IL (US); John Wendell Oglesbee, Watkinsville, GA (US); John Edward Herrmann, Sugar Hill, GA (US)

(73) Assignee: Motorola, Inc, Schaumburg, IL (US)

( * ) Notice: Subject to any disclaimer, the term of this patent is extended or adjusted under 35 U.S.C. 154(b) by 0 days.

(21) Appl. No.: 10/155,790

(22) Filed: May 26, 2002

(51) Int. Cl.$^7$ .................................................. H02J 7/00
(52) U.S. Cl. ....................................... 320/136; 320/135
(58) Field of Search ................................. 320/136, 135, 320/127, 134, 137

(56) References Cited

U.S. PATENT DOCUMENTS

| | | | |
|---|---|---|---|
| 3,263,092 A | 7/1966 | Knauss | 323/311 |
| 3,312,889 A | 4/1967 | Gold | 320/154 |
| 4,965,506 A | 10/1990 | Algra | 320/164 |
| 6,002,239 A | 12/1999 | Maloizel | 320/136 |
| 6,331,763 B1 * | 12/2001 | Thomas et al. | 320/136 |
| 6,331,764 B1 | 12/2001 | Oglesbee | 320/136 |

* cited by examiner

Primary Examiner—Edward H. Tso
Assistant Examiner—Lawrence Luk
(74) Attorney, Agent, or Firm—Philip H. Burrus, IV

(57) ABSTRACT

This invention includes a trickle charging circuit that works with a series charging element to charge battery cells with a low, constant current when the voltage of the cell is below a predetermined operational range. The trickle charging circuit includes a control transistor that is actuated by a current source when both the power supply and undervoltage battery cell are coupled. The trickle charging continues until a minimum operational voltage of the cell is reached. The invention includes a means for rapid charging the cell once the cell voltage is within a preferred operational range. The circuit includes means for charging at other currents, like mid-rate currents, as well.

17 Claims, 2 Drawing Sheets

BATTERY TRICKLE CHARGING CIRCUIT

BACKGROUND

1. Technical Field

This invention relates generally to battery charging circuits, and more specifically to battery charging circuits that apply a small current to a battery when the battery is below a predetermined threshold voltage.

2. Background Art

An increasing number of portable electronic products are available today that are powered by way of a rechargeble battery. These products include such things as cellular telephones, portable radios, pagers, personal digital assistants, MP3 players and voice recorders. Such products owe their convenient mobility to the use of rechargeable batteries. Within these batteries, various chemistries have been used to provide electrical power. Traditionally, popular chemistries included nickel-cadmium and nickel-metal-hydride. More recently, however, designers have used lithium-based cells, including lithium-ion and lithium-polymer, due to the many advantages they offer over nickel-based chemistries. These advantages primarily include low weight and overall size with a high energy density.

Rechargeable batteries generally include a protection circuit within the battery pack. Protection circuits are prolific in battery packs employing lithium-ion and lithium-polymer cells. When rechargeable cells are charged, the voltage of the cell rises. Lithium-based rechargeable cells typically have a maximum termination voltage of 4.1 or 4.2 volts. This means that if a lithium-based battery is charged beyond the termination voltage—known as an "overvoltage condition"—the reliability of the cell may be compromised. Most lithium battery protection circuits known in the art sense the voltage of the cell and terminate charging by opening a switch when the cell reaches the proper termination voltage.

There is another condition however, known as an "undervoltage condition", that occurs when the cell voltage drops below it's recommended operating point. For a typical lithium-ion cell, this voltage is about 2.5 volts. When the voltage drops below this level, possibly due to over discharge, cell manufacturers suggest that rapid charging may damage the cell by inhibiting the storage capacity. To prevent performance loss, therefore, the battery must be slowly charged until it reaches the minimum operational threshold. The slow charging current, often called a "trickle current", is on the order of a few hundred milliamps. Once the minimum threshold is reached, a full charging current, like 1 amp for example, may be applied until the maximum termination voltage is reached.

Many prior art charging systems, like that disclosed in U.S. Pat. No. 6,002,239 to Maloizel, do not include trickle-charging circuits. Consequently, when a battery with a voltage below the recommended minimum is coupled to such a charger, either the battery is charged improperly or not charged at all. There is thus a need for a low-cost charging circuit that accommodates trickle charging.

DETAILED DESCRIPTION OF THE INVENTION

Figure 1:
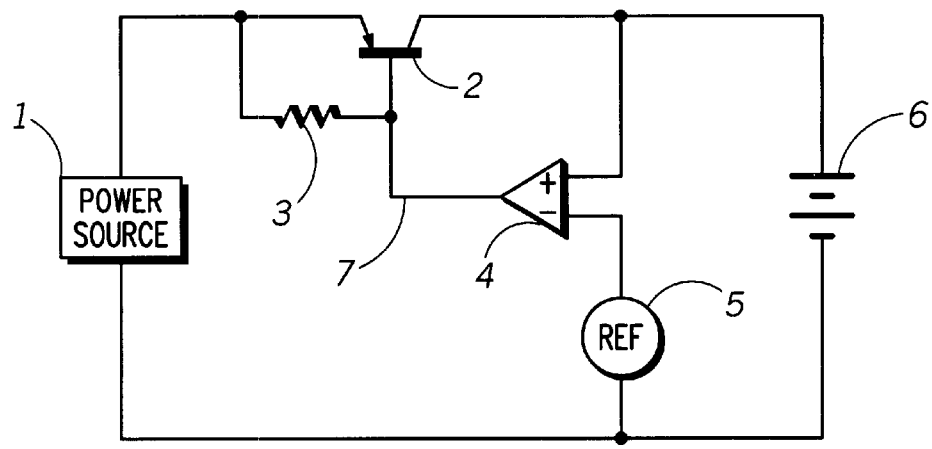
FIG. 1 is a prior art charging system.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Referring now to FIG. 1, illustrated therein is a typical prior art charging circuit 10. The charging circuit includes a series pass element 2, a comparator 4 and a reference voltage 5. The reference voltage 5 is typically set to the termination voltage of the cell 6, which is typically 4.1 to 4.2 volts for single-cell lithium applications.

Essentially, when the power source 1 is connected to the circuit 10, the comparator's output 7 will be low, as the voltage of the cell 6 is below the reference voltage. The low output causes the pass element 2, represented here by a bipolar junction transistor (BJT), is turned on. This allows current to flow from the power source 1 to the cell 6. Once the cell 6 charges to a voltage greater than the reference voltage 5, the comparator output 7 goes high, thereby turning off the pass element 2. A pull-up resistor 3 ensures that the pass element 2 is off.

This prior art circuit 10 presumes that the cell voltage is above the minimum operating voltage when coupled to the circuit 10. When the cell 6 is connected, the full current supplied by the power source 1 flows through the cell 6 until the termination voltage is reached. Consequently, if the cell voltage is initially below the minimum threshold, the cell may be improperly charged.

Figure 2:
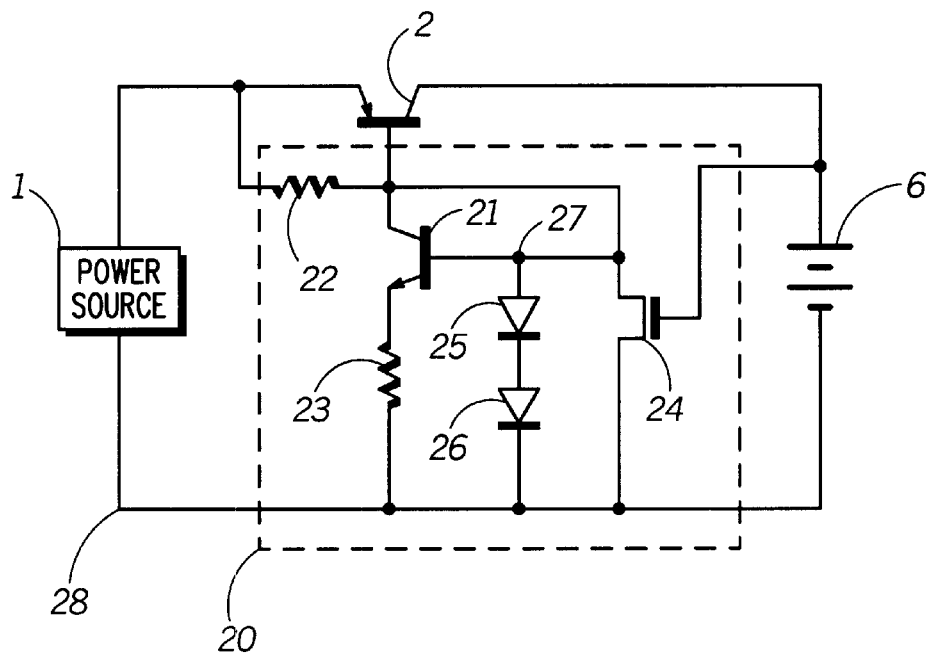
FIG. 2 is a trickle charging circuit in accordance with the invention.

Referring now to FIG. 2, illustrated therein is one preferred embodiment of this invention. The circuit 20 includes trickle charge control to facilitate low-current charging for cells with voltages below their predetermined operating thresholds. The circuit 20 works as follows: First, the circuit presumes that a power source 1 and cell 6 are coupled to the circuit 20, and that the cell 6 is below the minimum threshold voltage. A current flows through a first resistor 22 and then through a pair of diodes 25,26, thereby creating a bias voltage at the base 27, or control node, of the control transistor 21. This bias voltage thus turns on the control transistor 21, which then turns on the pass element 2. A second resistor 23 limits the amount of current flowing through the pass element 2. It will be clear to those of ordinary skill in the art that other components capable of producing a voltage, including voltage references, resistors and capacitors, may be substituted for the pair of diodes 25,26.

Once the voltage across the cell reaches the threshold voltage of the MOSFET 24, however, the MOSFET 24 turns on, thereby shorting out the pair of diodes 25,26. With the pair of diodes 25,26 shorted to ground 28, there is insufficient voltage at the base 27 of the control transistor 21 to keep it on. The control transistor 21 thus turns off, thereby turning off the pass element 2. By tailoring the threshold voltage of the MOSFET 24 to the minimum operational threshold of the cell 6, the circuit 20 facilitates trickle charging until the cell reaches it's preferred operational voltage range. It will be clear to those of ordinary skill in the art that other switching components, including comparators and bipolar junction transistors, could be substituted for the MOSFET 24.

Figure 3:
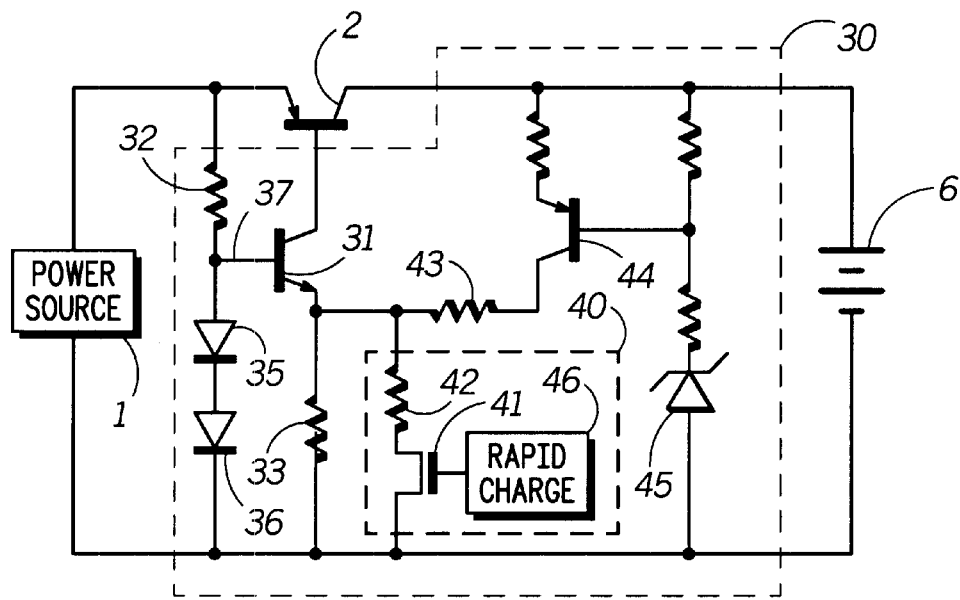
FIG. 3 is an alternate embodiment of a charging circuit in accordance with the invention.

Referring now to FIG. 3, illustrated therein is an alternate embodiment of the invention that offers improved trickle charge termination characteristics, as well as offering rapid charging capabilities. The circuit 30 includes a first resistor 32, which acts as a current source to a pair of diodes 35,36, just as in the circuit 20 of FIG. 2. The resulting voltage across the pair of diodes 35,36 turns the control transistor 31 on, thereby turning the pass element 2 on. This action facilitates trickle charging of the cell 6 if its voltage is below the minimum operational threshold voltage of the cell.

The circuit 30 differs from the circuit 20 of FIG. 2, however, in the trickle charge termination method. The circuit 20 of FIG. 2 used a MOSFET 24 to terminate trickle charge. Recall that the threshold voltage of the MOSFET 24 had to be tailored to the minimum operational threshold of the cell 6. While this is the most economical solution, it is not always convenient to tailor the threshold voltages of MOSFETs to specific applications.

Consequently, the circuit 30 of FIG. 3 employs a voltage reference 45 in conjunction with a termination transistor 44 to terminate trickle charging. The voltage reference 45 may be as simple as a zener diode, but may comprise other voltage references and equivalents. When the voltage of the cell 6 exceeds the reference voltage 45, the termination transistor 44 is actuated. This actuation sources current into the resistor 33 limiting the conduction of the pass element 2. As the voltage across this resistor 33 increases, the pass element 2 is turned off, thereby terminating trickle charging. A current limiting resistor 43 limits the sourced current from the termination transistor 44. By using a voltage source in the circuit 30 of FIG. 3 as opposed to a MOSFET 24 as in FIG. 2, the designer has more freedom to tailor the termination of trickle charging to an accurate voltage.

The circuit 30 of FIG. 3 also includes a means of rapid charging 40. In this exemplary embodiment, the means for rapid charging 40 comprises a rapid charge transistor 41, a rapid charge resistor 42 and a rapid charge control circuit 46. Once the trickle charging has terminated, the rapid charging circuit 46 actuates the rapid charge transistor 41. This allows current to flow from the control transistor 31 through the rapid charge resistor 42. If the rapid charge resistor 42 has impedance much less than that of the resistor 33 limiting the conduction of the pass element 2, the parallel resistance is reduced, thereby actuating, by way of increased current, the control transistor 31. The control transistor 31 thus actuates the pass element 2 allowing increased current to flow to the cell 6.

It should be noted that the rapid charging circuit could comprise many voltage sensing circuits known in the art, including commercial battery charging circuits like the NCP802 manufactured by On-Semiconductor which toggle a charging pin when the cell is within its preferred operating range. Alternatively, the rapid charging circuit may be as simple as a comparator that senses when the battery is within its preferred operational range. It will be obvious to those of ordinary skill in the art that many equivalent voltage-sensing circuits will suffice as the rapid charging circuit.

Additionally, it should be noted that circuit 40 of FIG. 3 need not be the only parallel path about resistor 33. For example, a second circuit with a resistor having impedance between that of the rapid charging circuit and the trickle charging circuit could be coupled to provide for mid-rate charging. Any number of parallel circuits could be added, each having its own control circuit.

Additionally, another transistor may be placed in series with either the mid-rate or rapid charging transistors that serves as an override to the charging paths. When the series transistor is open, no current flows through the circuits about resistor 33 of FIG. 3. This other transistor thereby serves as an override to terminate charging in the event of a fault condition.

Note that the aforementioned embodiments have included components coupled to the pass element to facilitate trickle charging. It may be desirable to employ a conventional charging circuit, like that shown in FIG. 1, with a trickle charging circuit in parallel. This invention contemplates such a solution: a trickle charging circuit that may be coupled in parallel with a conventional charging circuit, the trickle charging circuit facilitating trickle charging only when the battery cell is in an undervoltage condition. When the battery cell is not in an undervoltage condition, the trickle charging circuit has a self-terminating feature that removes itself from the circuit. Such a circuit is shown in FIG. 4.

Figure 4:
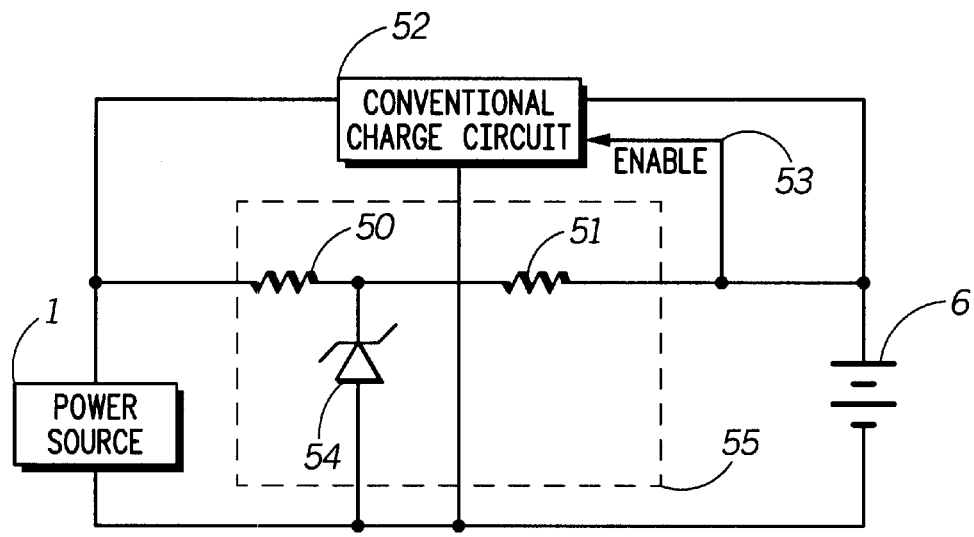
FIG. 4 is a trickle charging circuit in accordance with the invention coupled in parallel with a conventional charging circuit.

Referring now to FIG. 4, illustrated therein is a conventional charging circuit 52, a rechargeable battery cell 6 and a power source 1. Coupled in parallel with the conventional charging circuit 52 is the trickle charge circuit 55, comprising a first resistor 50, a second resistor 51, and a zener diode 54. The reverse breakdown voltage of the zener diode 54 is selected to correspond to the undervoltage threshold of the battery cell 6. When the voltage of the battery cell 6 is below the reverse breakdown voltage of the zener diode 54, the zener diode 54 acts like an open circuit, thereby allowing a trickle current, limited by resistors 50,51, to flow. Once the voltage of the battery cell 6 reaches or exceeds the reverse threshold voltage of the zener diode 54, the zener diode 54 begins conducting current. As the breakdown impedance of the zener diode is less than the impedance of the battery cell 6 and resistor 51, the trickle charging current through resistor 51 ceases to flow. A voltage based enable line 53, corresponding to the operational voltage range 53 of the battery cell 6, then allows the conventional charging circuit 52 to charge the battery in a conventional manner.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while one preferred embodiment contemplates trickle and rapid charging, any number of additional charging circuits, each with correspondingly different resistors, could be coupled to build a circuit having multi-configurable charging schemes.

What is claimed is:

1. A circuit for trickle charging a rechargeable battery cell, the circuit comprising:
   a. at least one rechargeable battery cell;
   b. at least one power source;
   c. at least one pass element coupled serially between the at least one rechargeable battery cell and the at least one power source;
   d. a control transistor having a control node, the control transistor being coupled to the at least one pass element;
   e. a means for sourcing current coupled to the control node;
   f. a means for generating a voltage in response to the means of sensing current coupled to the control node; and g. a means for termination coupled to the control transistor.

2. The circuit of claim 1, wherein when the means of generating a voltage generates a voltage, the control transistor is actuated, thereby actuating the as least one pass element, allowing current of a first magnitude to flow between the at least one power source and the at least one rechargeable battery cell.

3. The circuit of claim 2, wherein the means for termination is actuated when the at least one rechargeable battery cell reaches a predetermined threshold.

4. The circuit of claim 3, wherein actuation of the means for termination causes cessation of flow of the current of a first magnitude between the at least one power source and the at least one rechargeable battery cell.

5. The circuit of claim 4, further comprising a means for charging, the means for charging being capable of actuating a flow of a current of a second magnitude between the at least one power source and the at least one rechargeable battery cell.

6. The circuit of claim 5, further comprising a first resistor coupled to the control transistor.

7. The circuit of claim 6, wherein the means for generating a voltage comprises a pair of diodes.

8. The circuit of claim 7, wherein the means for termination comprises a transistor.

9. The circuit of claim 8, wherein the transistor comprises a metal-oxide field effect transistor.

10. The circuit of claim 6, wherein the means for termination comprises a voltage reference.

11. The circuit of claim 10, wherein the voltage reference corresponds to the predetermined threshold.

12. The circuit of claim 11, wherein the means for charging comprises:

a. at least one charge circuit;

b. at least one charge transistor; and c. at least one charge resistor.

13. The circuit of claim 12, wherein the at least one charge resistor has an impedance different from an impedance of the first resistor.

14. The circuit of claim 13, wherein the means for charging is actuated once the voltage of the at least one rechargeable battery cell exceeds the predetermined threshold.

15. A circuit for trickle charging a rechargeable battery cell, the circuit comprising:

a. at least one rechargeable battery cell;

b. at least one power source;

c. at least one charging circuit coupled serially between the at least one power source and the at least one rechargeable battery cell; and d. at least one trickle charging circuit coupled in parallel with the at least one charging circuit, the trickle charging circuit consisting essentially of:

i. a first resistor;

ii. a second resistor; and iii. a zener diode.

16. The circuit of claim 15, wherein the zener diode is selected to correspond to a predetermined voltage threshold associated with the at least one rechargeable cell.

17. The circuit of claim 16, wherein the at least one charging circuit comprises an enable input, such that the at least one charging circuit is actuated when the voltage of the rechargeable battery cell exceeds the predetermined voltage threshold.

* * * * *